July 18, 1950      F. L. KORB      2,515,453
NONINTERMITTENT MOTION-PICTURE
PROJECTION APPARATUS
Filed Oct. 7, 1947      5 Sheets-Sheet 1
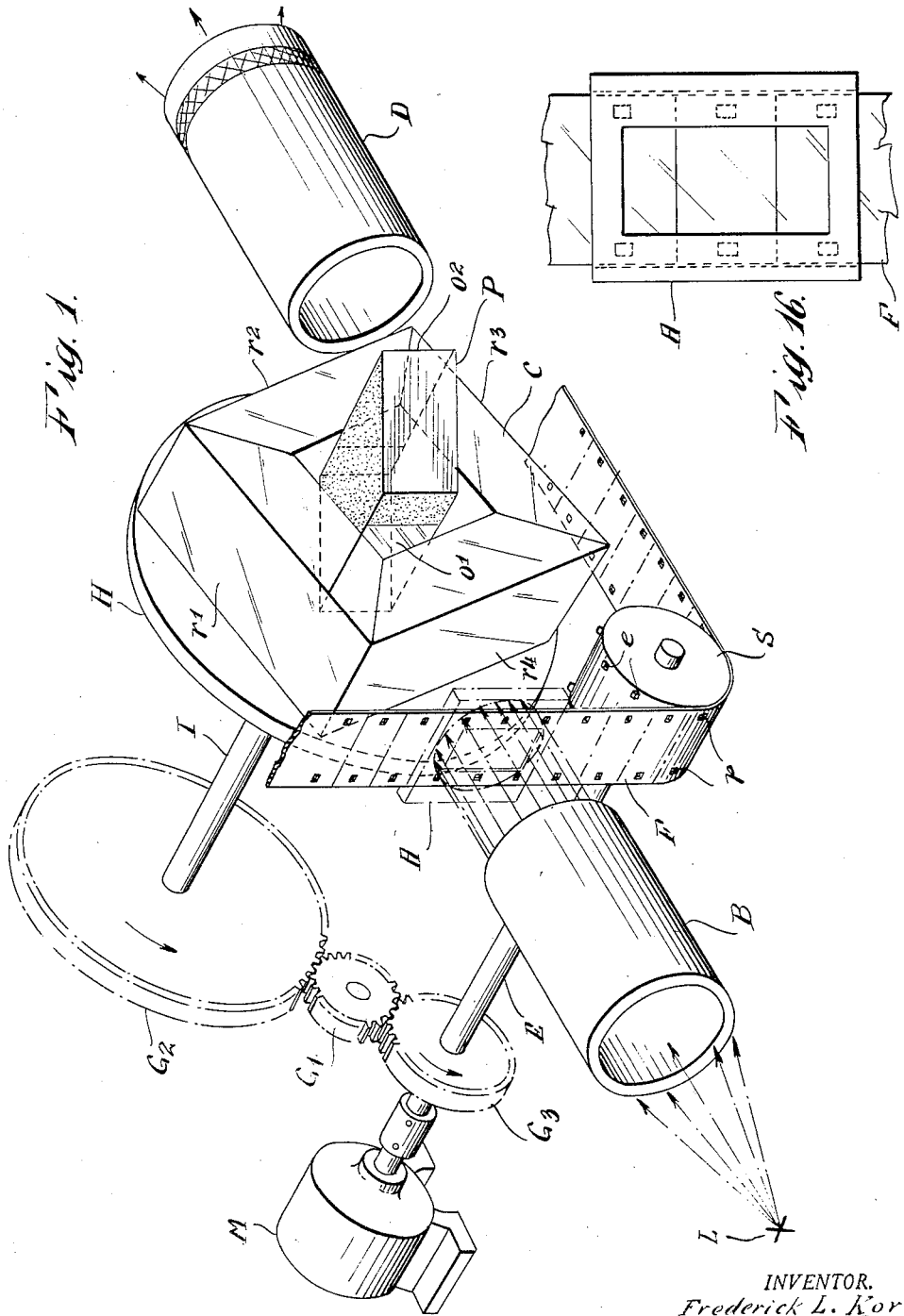
INVENTOR.
Frederick L. Korb
BY
ATTORNEY.

July 18, 1950 F. L. KORB 2,515,453
NONINTERMITTENT MOTION-PICTURE
PROJECTION APPARATUS
Filed Oct. 7, 1947 5 Sheets-Sheet 2
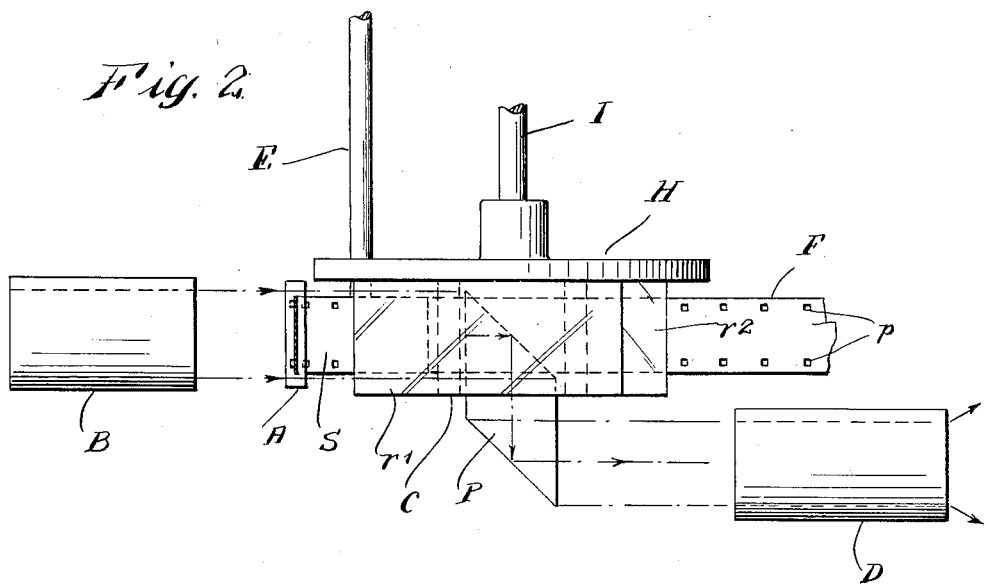
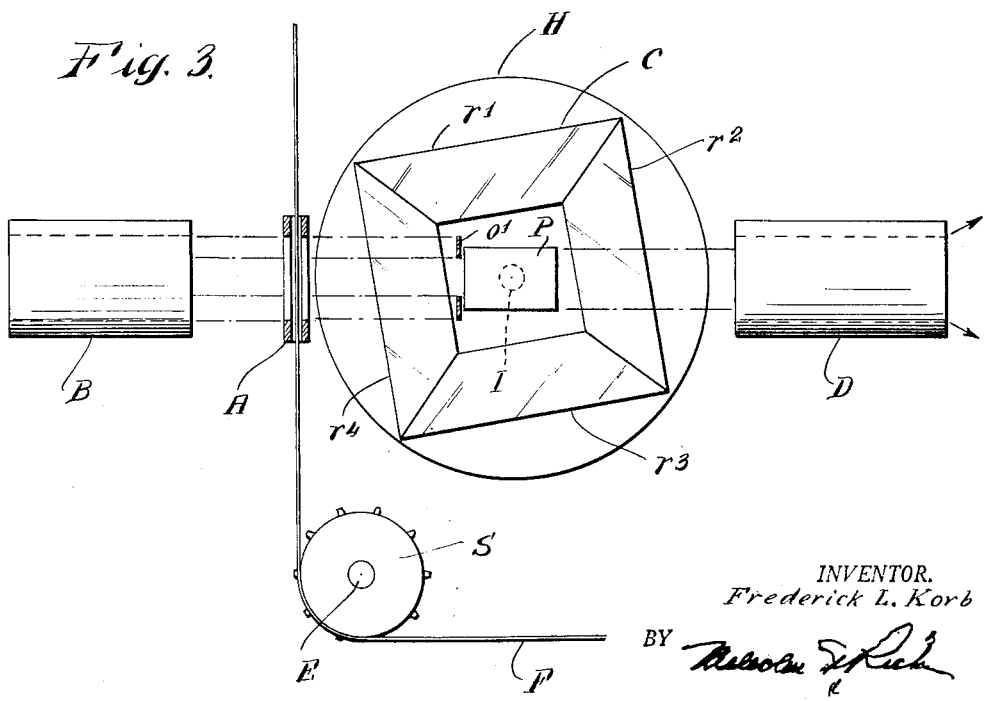
INVENTOR.
Frederick L. Korb
BY
ATTORNEY

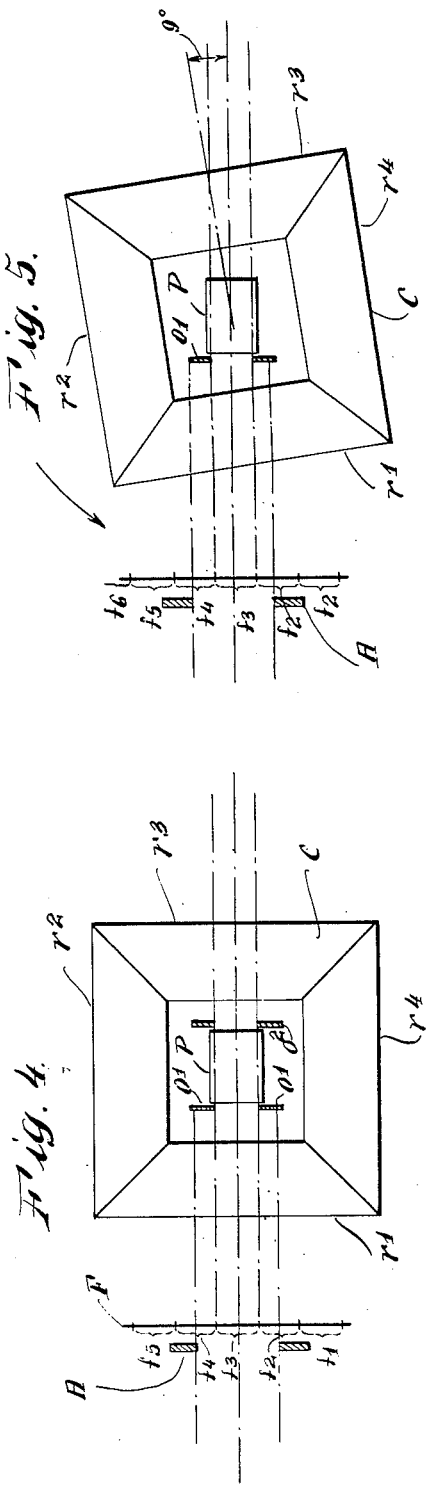
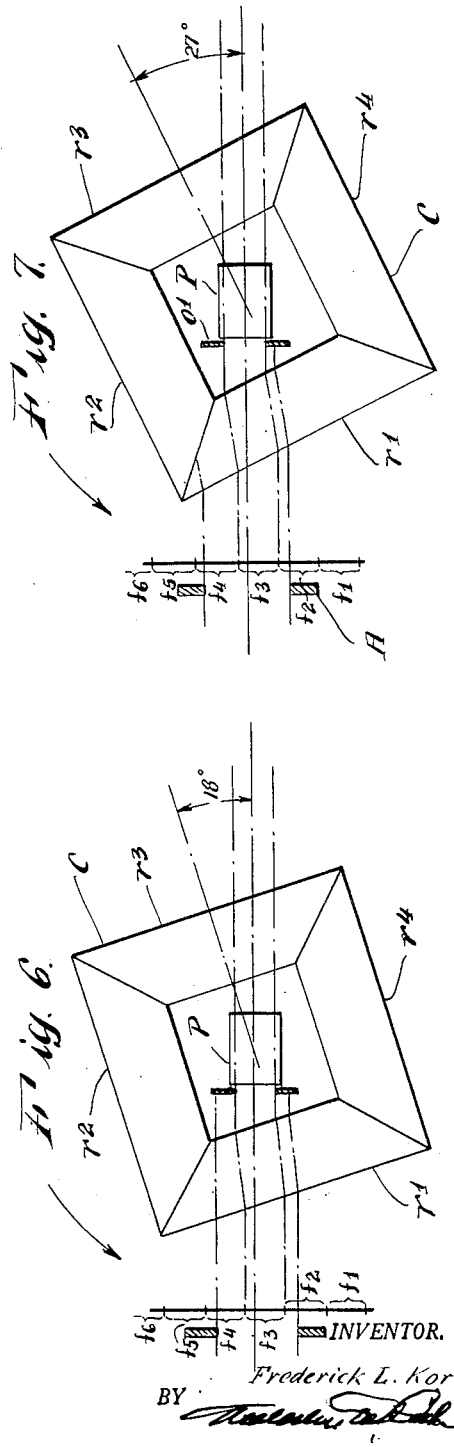

July 18, 1950
F. L. KORB
2,515,453
NONINTERMITTENT MOTION-PICTURE
PROJECTION APPARATUS
Filed Oct. 7, 1947
5 Sheets-Sheet 4
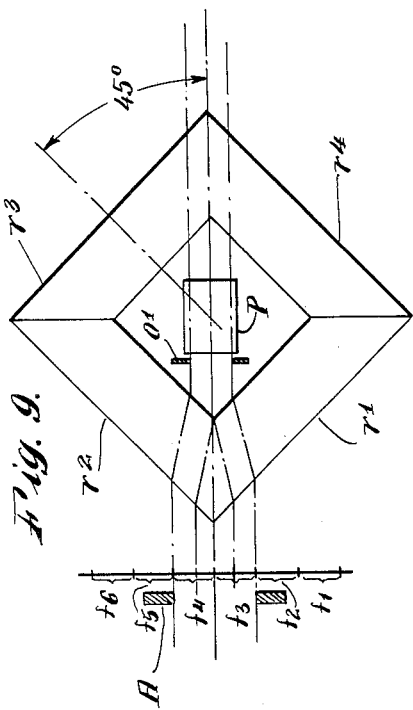
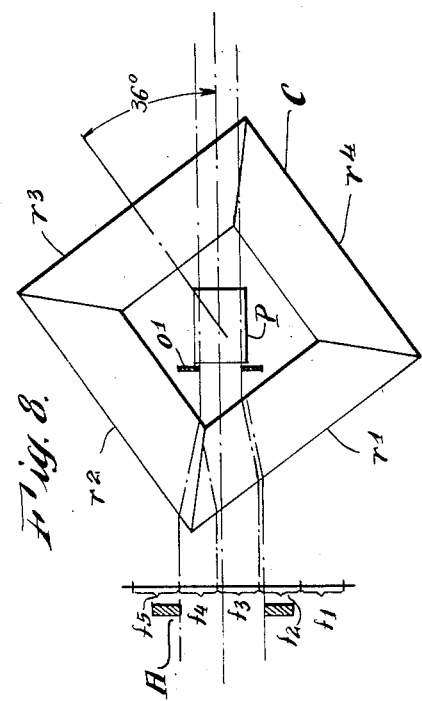
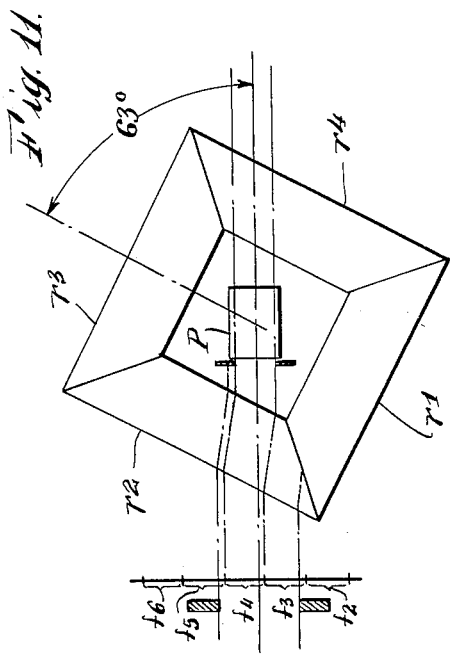
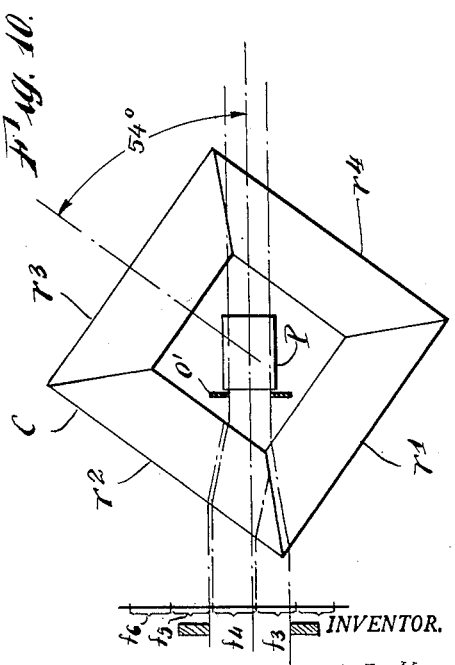
INVENTOR.
Frederick L. Korb
BY
ATTORNEY.

July 18, 1950
F. L. KORB
2,515,453
NONINTERMITTENT MOTION-PICTURE
PROJECTION APPARATUS
Filed Oct. 7, 1947
5 Sheets-Sheet 5
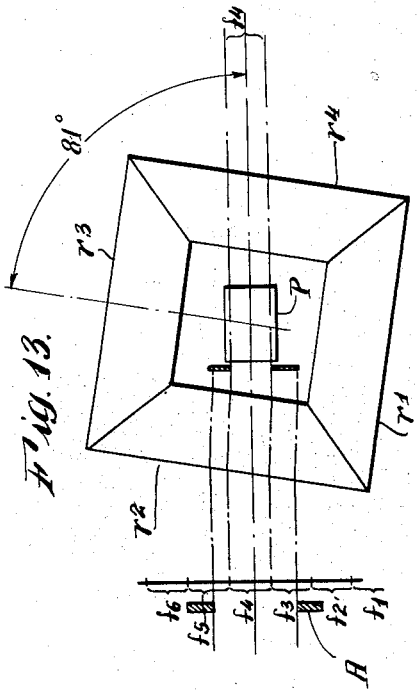
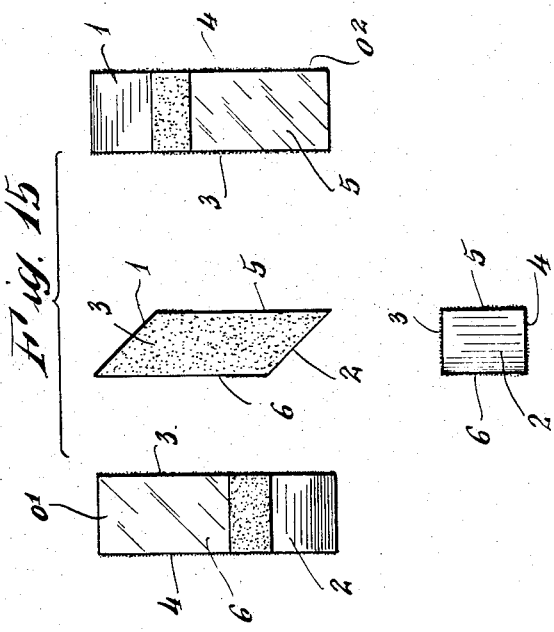
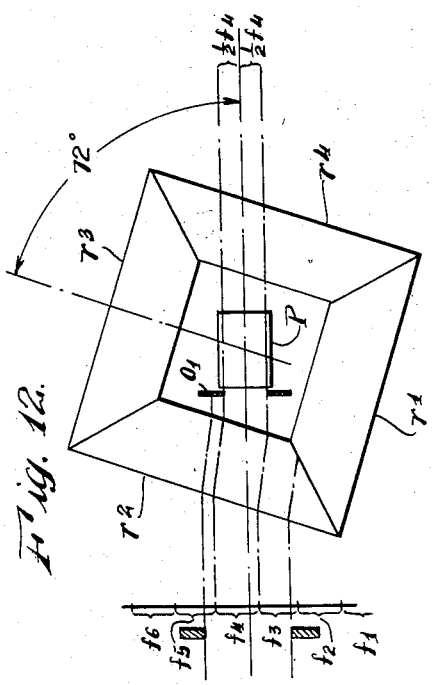
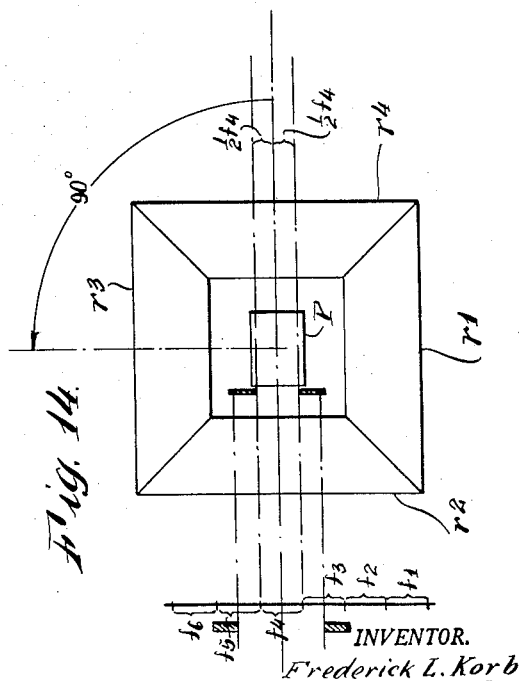
INVENTOR.
Frederick L. Korb
BY
ATTORNEY.

Patented July 18, 1950

2,515,453

UNITED STATES PATENT OFFICE 2,515,453

NONINTERMITTENT MOTION-PICTURE PROJECTION APPARATUS

Frederick L. Korb, Honesdale, Pa.

Application October 7, 1947, Serial No. 778,485

3 Claims. (Cl. 88—16.8)

This invention relates to motion picture projectors and has for its major object the provision of an improved projector device wherein the motion picture film is advanced through the illuminated film gate of the projector at a constant rate of speed and an optical means is provided to maintain the projected moving image of each picture frame passing through the said gate stationary at a determined focal point for reflected projection in magnified form onto a moving picture screen.

Another object is to provide an optical means operative to maintain a moving image projected therethrough stationary at a determined focal point for reflected projection in magnified form onto a moving picture screen.

Still another object is to provide a moving picture projector device with means operative to feed the film therethrough at a substantially constant rate of speed and an optical means operative to receive and project in magnified form upon a screen, the moving image of each successive picture frame on the film as a sequence of stationary images without substantal intervening light losses.

Other objects will be apparent as the invention is more fully hereinafter disclosed.

Heretofore in the art, in the projection of motion pictures, it has been customary to advance the motion picture film intermittently through an illuminated film gate. The present invention aims to provide a motion picture projector in which means are provided to move the film through the illuminated film gate at a substantially constant rate of speed, instead of intermittently, and by the provision of an optical means arranged and adapted to correct for the movement in the moving image of each picture frame as it passes through the film gate, to hold the image stationary at a determined focal point for reflected projection through a magnifying lens system onto a screen.

In the adaptation of the present invention to modern type motion picture projectors, the intermittent film feed means normally provided must be replaced by a constant feed means, the film gate must be enlarged to be two frames high instead of one, and the optical means of the present invention must be interposed between the moving film and the magnifying lens system normally present in the device for projecting the image in magnified form upon a screen, with the said magnifying system re-located relative to the optical means of the present invention to cooperatively function therewith in the same way. Otherwise, substantially all other means and instrumentalities normally present and associated with the modern type motion picture projectors remain unchanged. For purposes of clarity, accordingly, the present inventon is illustrated and shown in the accompanying drawings limited to the essential elements thereof, the non-essential elements otherwise old and well known in the art being eliminated.

In the drawings—

Fig. 1 is a perspective view of the essential elements of the present invention as adapted for use with any standard type of motion picture projector;

Fig. 2 is a top view of the same;

Fig. 3 is a side view of the same;

Figs. 4 to 14, inclusive, illustrate schematically the operation of the optical means of the present invention through one cycle of operation; and Fig. 15 illustrates in four (4) views, $a$ to $d$, inclusive, the characteristics of one of the elements of the optical means of the present invention;

Fig. 16 is a front view of the modified film gate of the present invention.

Referring first to Figs. 1 to 3, inclusive, the essential elements illustrated include the following:

A film gate A, having a size providing an aperture therethrough approximately two (2) picture frames high and one (1) picture frame wide;

Means to project through said film gate aperture a beam of light radiation substantially uniformly illuminating the aperture, said means preferably consisting of a light source L and a lens system B for projecting through the aperture a beam consisting of substantially parallel rays of light radiation of high intensity;

Means advancing the motion picture film F vertically downward through the illuminated film aperture at a substantially constant rate of speed locating centrally within the 2-frame high film gate aperture a determined number of picture frames $f_1$, $f_2$, $f_3$, (etc.) per second, within the range 16 to 24 as heretofore practiced in the art, said means comprising a rotating spindle S provided with spaced extensions $e$ on opposite sides of the curved face thereof, the spacing between said extensions $e$ being aligned to engage within spaced edge perforations $p$ in the film F, the said spindle S being forwardly driven by means of an electric motor M directly or indirectly connected through an appropriate gear train to drive shaft E on which spindle S is mounted for rotation therewith;

An optical means to project the moving image of each picture frame passing through the illuminated film gate A as a stationary image at a determined focal point, said means consisting of a rotating refracting element C consisting of a plurality of (specifically four (4)) plano-parallel refracting elements $r_1$ to $r_4$, inclusive, arranged as a hollow square and being mounted for rotation about the center of the square and about a horizontal axis normal to the center axis of film gate A and the beam of light radiation projected therethrough; each said refracting element $r_1$ to $r_4$, inclusive, is of identical composition and of identical size, shape and configuration.

Preferably refracting elements $r_1$ to $r_4$, inclusive, are comprised of the best optical glass. With elements of this composition, the plano-parallel elements $r_1$ to $r_4$, inclusive, are each slightly wider than the aperture opening in film gate A, with each opposite end beveled at right angles and joined to each other in an optically smooth joint. The thickness to each element $r_1$ to $r_4$, inclusive, is calculated with respect to the refractive index of the material to provide upon rotation of the element about the axis of rotation and in the direction indicated, for the refraction of a downwardly moving beam of light vertically upward a sufficient distance within the element to maintain a substantially constant point of egress from the element where the rate of rotation of the element approximates the rate of movement of the said beam. The length of each element $r_1$ to $r_4$ is identical and the smallest practical length providing a center hollow area sufficient to receive prism P and to give the closest possible spacing of the rotating square to film F. This may vary widely without essential departure from the invention.

Means for rotating optical means C, said means including disc H, upon the face of which refracting element C is secured concentrically about its center rotating axis, and driven shaft I to which disc H is secured for axial rotation about its center axis, said shaft being sustained with its center axis lying in a plane normal to the axis of light projection and with the plane outer surfaces of one of the refracting elements $r_1$ to $r_4$ (inclusive) disposed in a position normal to the path of light projection and in as close spaced position to the film gate A as will provide clearance for the corners of the square member upon rotation. Shaft I preferably is rotated by motor M through gear train $G_3$, $G_1$ and $G_2$, the gear ratios thereof being selected with respect to the rotating speed of motor M to impart to refracting element C a rate of rotation relative to the rate of film feed through the film gate A providing approximately for a one-fourth (¼) rotation of member C for each picture frame centrally located within the film aperture.

In association and combination with rotating refracting member C is provided double internal reflecting prism P which is fixedly located or disposed within hollow square member C in a position to receive the stationary image of each picture frame as it emerges from each refracting element $r_1$ to $r_4$ (inclusive) and to reflectingly project the same outwardly within the prism and forwardly out of the prism to and through magnifying lens system D and onto a screen.

The details of prism P are indicated in Fig. 15 wherein views a, b, c and d, show, respectively, front, top, rear and one end views of the prism.

Referring to these views, the prism is essentially a rhomboid parallelogram comprised of the best optical glass having a thickness between the top and bottom faces 3 and 4 which is approximately equal to the height of one picture frame on film F. The opposite end faces 1 and 2 are provided with totally internally reflecting mirror surfaces, consisting of metal such as silver, and the opposite side faces 5 and 6 are each provided with entrance and exit orifices or apertures $O_1$ and $O_2$ approximating the size of one picture frame aligned with the internally reflecting mirror surfaces on ends 1 and 2 to reflect and project light radiation entering the entrance orifice through the prism and out through the exit orifice. The remaining surfaces of the prism P are etched or otherwise rendered opaque to the passage of light radiation therethrough.

Prism P is disposed within the hollow square rotating member C in such position as will locate the entrance orifice $O_1$ in intercepting position to light radiation passing through refracting elements $r_1$ to $r_4$, inclusive, with its center aligned with the axial center of the beam of radiation passing through the film gate aperture A, with the prism axis substantially at right angles to the axis of radiation projection and in the same horizontal plane, and with its first internally reflecting mirror surface disposed at the determined focal point of refracting of rotating member C, substantially as shown in the drawings.

The length of prism P between ends 1 and 2 is greater than the width of refracting elements $r_1$ to $r_4$ (inclusive) by an amount sufficient to at least locate exit orifice $O_2$ of the prism in a position clearing rotating member C for the projection of the image light rays passing therethrough into and through magnifying lens system D, substantially as indicated in the drawings.

Referring now to Figs. 4 to 14, inclusive, one complete operational cycle of the optical means of the present invention is schematically illustrated, the several elements shown therein being identified by the letters and numerals hereinabove given.

Fig. 4 shows the relative positioning of rotating member C to film F and to picture frames $f_1$, $f_2$ (etc.) thereon upon initiation of relative movement therebetween, the direction of movement of film F and rotating member C being indicated by arrows. As indicated, in first position, film F is adjusted to a position within film gate A locating one picture frame $f_3$ centrally within the film gate aperture and rotating member C is adjusted to a position where the refracting element $r_1$ intercepting the radiation passing through film F is substantially normal to the axis of radiation projection with the plane face thereof lying in a vertical plane parallel to the plane of the film.

For convenience in illustration, entrance and exit orifices $O_1$ and $O_2$ of prism P are shown as independent elements, as they may well be where a non-parallel beam of radiation is projected through film gate A.

As indicated by appropriate dot-dash lines in Fig. 4 the radiation projected through film gate A and film F with member C located in this position passes without refraction through refracting element $r_1$ of member C and through entrance orifice $O_1$ for mirror reflection internally outwardly and forwardly through prism P and through exit orifice $O_2$ in off-set axial alignment, the entrance and exit orifices $O_1$ and $O_2$ limiting the image passing in magnified form onto the screen to the image of the centrally located picture frame $f_3$.

With frame $f_3$ moving from this first position downwardly at any determined rate, within the range 16 to 24 frames per second, passing this central location area in film gate A, however, it is believed apparent that in the absence of member C rotation the bottom part of frame $f_4$ would start to show up in the projected image as the image of $f_3$ moves downwardly.

However, by rotating member C about its center axis at such a rate relative to the rate of film movement and in the direction of film movement as to provide an angle of incidence to the radiation forming the image of frame $f_3$ as will provide an angle of refraction neutralizing or off-setting the distance of image displacement, the image emerges from refracting element $r_1$ in substantially the same horizontal plane of a centrally located image and continues to be projected through orifice $O_1$ as a stationary image.

This is indicated sequentially in the succeeding Figures 5 to 14, inclusive, with each figure representing the optical result obtained with each 9° of member C rotation and equivalent distance of image displacement by film movement downwardly.

As may be noted in the figures, the optical result obtained is first a maintaining of the image of frame $f_3$ in a stationary position for projection through orifice $O_1$ in Figs. 4 to 7, inclusive, with the lower part of the following picture frame $f_4$ blacked out by upward refraction; secondly, a blacking of the upper part of $f_3$ and replacement of this blacked-out area with a corresponding area of the upper area of the following frame $f_4$, as indicated in Fig. 8; thirdly, as the corner of the rotating member C reaches the axis of beam projection, as indicated in Fig. 9, the upper half of frame $f_3$ and the bottom half of following frame $f_4$ are blacked-out and the image projected through orifice $O_1$ consists of a composite image made up from the bottom half of frame $f_3$ and the upper half of frame $f_4$; fourthly, as the corner of member C rotates below the axis of beam projection, the lower half of frame $f_3$ is gradually blacked-out and replaced by the bottom half of the following frame $f_4$, as the surface of refracting element $r_2$ is rotated around to the first position of refracting element $r_1$.

With continued rotation of member C this cycle is repeated, it being only necessary to time the rotation with respect to the rate of film movement to obtain this desired result.

With a rate of film feed locating from 16 to 24 picture frames per second centrally within the film gate A and a rate of rotation of member C providing a 90° rotation per frame centrally located in film gate A, synchronized with the film picture frames as hereinabove described, the merging of the images of adjacent picture frames is hardly discernable and there is substantially no light loss or black-out period intervening between the appearance of successive picture images on a screen with the result that by the present invention the projected motion picture is substantially free of flicker.

It is believed apparent to one skilled in the art that the invention may be widely modified without essential departure therefrom to obtain substantially equivalent results.

Whereas, for example, I have described and illustrated a square hollow member C, I am not to be construed as being limited thereby inasmuch as any plural-sided hollow member C whose number of sides is at least three (3) may, with suitable adjustment, also be employed, although for ready attachment and use with modern types of motion picture projectors the four-sided refracting member C has given the best experimental results.

Whereas, also for example, in the specific embodiment shown I have indicated preference for means to project a beam of parallel radiation through the film gate aperture, I am not to be construed as being limited thereto, as a beam of non-parallel radiation readily may be employed.

Whereas, I have also specified the use of optical glass in the forming of refracting elements $r_1$ to $r_4$, inclusive, and in prism P, I am not to be construed as being limited thereto as many other optical compositions may be employed in substitution therefor, and with possible optical advantage, such as for example, some of the optical resins now available in the art.

Various other modifications and departures will occur to those skilled in the art from the disclosure above given and all those are contemplated by me as may fall within the scope of the following claims.

What I claim is:

1. A motion picture projection device comprising in combination, a film gate having a two-frame high aperture therein, means projecting a beam of light radiation through the aperture to substantially uniformly irradiate the said aperture, means feeding a motion picture film through said gate at a substantially uniform rate locating from 16 to 24 picture frames per second centrally within said aperture, means for refracting the moving image of each picture frame as a stationary image at a determined focal point along the path of image projection, an internally reflecting prism having its first internal reflecting surface disposed at the said focal point and its last internal reflecting surface disposed in the desired path of image projection to a viewing screen, a one-frame high aperture overlying each said reflecting surface of the prism, and a magnifying lens system disposed in the path of image reflection to said screen with its focal point located at about the optical center of said last reflecting surface to project the reflected image in magnified form onto the viewing screen.

2. The combination of claim 1, said means for refracting the moving image of each picture frame as a stationary image at a determined point along the path of image projection comprising a rotating refracting means consisting of a plurality of identically shaped refracting elements mounted in determined spaced relation for rotation in an annular path adjacent the rear face of the film gate aperture with the axis of rotation disposed in the path of image projection, each said refracting element having plano-parallel faces aligned radially to the axis of rotation, said faces having a width and height greater than the width and height of one picture frame and a thickness providing a refractive index maintaining a moving beam of light stationary at the said axis of rotation, and means for rotating said refracting means in the direction of film movement at a rate relative to the rate of film movement bringing one of said elements in radial alignment with each picture frame as it is centered in the said film gate.

3. The combination of claim 1, said means for refracting the moving image of each picture frame as a stationary image at a determined point along the path of image projection comprising a rotating refracting means consisting of four identically shaped refracting elements and secured together in an optical joint to form a hollow square and mounted for rotation in an annular path adjacent the rear face of the film gate aperture with the axis of rotation disposed in the path of image projection, each said refracting element having plano-parallel faces aligned radially to the axis of rotation, said faces having a width and height greater than the width and height of one picture frame and a thickness providing a refractive index maintaining a moving beam of light stationary at the said axis of rotation, and means for rotating said refracting means in the direction of film movement and at a rate synchronized with the rate of film movement through the film gate radially aligning said refracting elements 16 to 24 times per second as the rate of film movement varies from 16 to 24 picture frames per second.

FREDERICK L. KORB.

REFERENCES CITED

The following references are of record in the file of this patent:

UNITED STATES PATENTS

| Number | Name | Date |
|---|---|---|
| Re. 22,960 | Leventhal | Jan. 6, 1948 |
| 721,954 | Huet et al. | Mar. 3, 1903 |
| 1,818,410 | Leventhal | Aug. 11, 1931 |
| 1,974,573 | Leventhal | Sept. 25, 1934 |
| 2,070,033 | Tuttle | Feb. 9, 1937 |
| 2,085,594 | Leventhal | June 29, 1937 |
| 2,288,079 | Fitz | June 30, 1942 |
| 2,397,730 | Ehrenhaft | Apr. 2, 1946 |

FOREIGN PATENTS

| Number | Country | Date |
|---|---|---|
| 155,243 | Austria | Dec. 10, 1938 |